(12) United States Patent
Chung

(10) Patent No.: US 8,469,526 B1
(45) Date of Patent: Jun. 25, 2013

(54) KALEIDOSCOPE AND OBJECT CELL THEREOF

(76) Inventor: Tung-Kuei Chung, Taichung (TW)

(*) Notice: Subject to any disclaimer, the term of this patent is extended or adjusted under 35 U.S.C. 154(b) by 0 days.

(21) Appl. No.: 13/450,538

(22) Filed: Apr. 19, 2012

(51) Int. Cl.
*G02B 27/08* (2006.01)

(52) U.S. Cl.
USPC .......................................... 359/617

(58) Field of Classification Search
USPC ................................ 359/616–617; 446/219
See application file for complete search history.

(56) References Cited

U.S. PATENT DOCUMENTS

| | | | | |
|---|---|---|---|---|
| 754,143 A * | 3/1904 | Johnson | ...................... | 359/617 |
| 1,662,743 A * | 3/1928 | Hanson | ...................... | 359/617 |
| 3,014,302 A * | 12/1961 | Hughes | ...................... | 434/96 |
| 3,039,356 A * | 6/1962 | Knittel | ...................... | 359/617 |
| 3,122,859 A * | 3/1964 | Reaux, Jr. | ...................... | 446/152 |
| 3,255,661 A * | 6/1966 | Marban | ...................... | 359/617 |
| 5,172,270 A * | 12/1992 | Peiperl | ...................... | 359/617 |
| 5,469,297 A * | 11/1995 | Marshall et al. | ...................... | 359/617 |
| 5,980,043 A * | 11/1999 | Wong | ...................... | 353/2 |
| 7,101,046 B2 * | 9/2006 | Hattori et al. | ...................... | 353/1 |
| 7,207,682 B2 * | 4/2007 | Stephens | ...................... | 359/616 |
| 2004/0246585 A1 * | 12/2004 | Mizoguchi | ...................... | 359/617 |

* cited by examiner

*Primary Examiner* — Christopher Mahoney
(74) *Attorney, Agent, or Firm* — Alan Kamrath; Kamrath IP Lawfirm, P.A.

(57) ABSTRACT

A kaleidoscope has a main body, a tubular cover and an object cell. The tubular cover is rotatably connected with an end of the main body. The object cell is securely mounted in the tubular cover and has a scrap box, a background box, multiple scraps, multiple colored beads, a strip unit and a background. The scraps and the colored beads are movably mounted or disposed in the scrap box. The strip unit is mounted in the scrap box. The background is mounted in the background box. Movements of and between the moveable scraps and colored beads create color combinations and patterns.

15 Claims, 7 Drawing Sheets

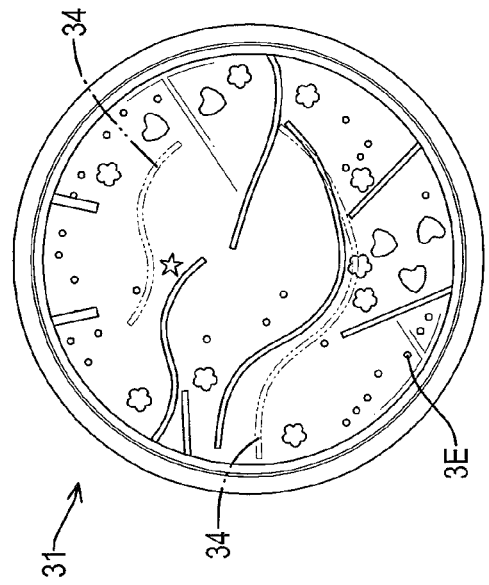
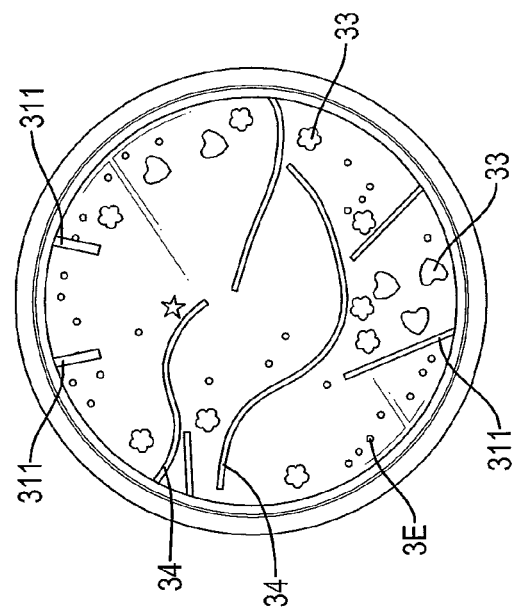

KALEIDOSCOPE AND OBJECT CELL THEREOF

BACKGROUND OF THE INVENTION

1. Field of the Invention

The present invention relates to a kaleidoscope and an object cell thereof and, more particularly, to a kaleidoscope and an object cell thereof that increase color combinations and pattern variations.

2. Description of Related Art

A conventional kaleidoscope has a main body and an object cell. The main body has a lens. The object cell is rotatably connected with the main body and has a scrap box and a background box.

Colored objects, such as colored beads or scraps, are mounted or disposed in the scrap box of the object cell. As a viewer looks into the main body through the lens, a colorful pattern is created. With the rotation of the object cell and tumbling of the colored objects, the patterns and the color combinations are also changed.

However, the color combinations as well as the patterns created merely by the colored objects are still insufficient. Moreover, a background mounted in the background box is monotonous and is not capable of creating various, stereoscopic patterns and color combinations.

To overcome the shortcomings, the present invention tends to provide a kaleidoscope and an object cell thereof to mitigate the aforementioned problems.

SUMMARY OF THE INVENTION

The main objective of the invention is to provide a kaleidoscope and an object cell thereof that increase color combinations and pattern variations.

A kaleidoscope has a main body, a tubular cover and an object cell. The tubular cover is rotatably connected with an end of the main body. The object cell is securely mounted in the tubular cover and has a scrap box, a background box, multiple scraps, multiple colored beads, a strip unit and a background. The scraps and the colored beads are movably mounted or disposed in the scrap box. The strip unit is mounted in the scrap box. The background is mounted in the background box.

Other objects, advantages and novel features of the invention will become more apparent from the following detailed description when taken in conjunction with the accompanying drawings.

BRIEF DESCRIPTION OF THE DRAWINGS

FIG. 4 is an enlarged front view of the object cell of the kaleidoscope in FIG. 3;

FIG. 5 is an operational front view of the object cell of the kaleidoscope in FIG. 4;

DETAILED DESCRIPTION OF PREFERRED EMBODIMENT

Figure 1:
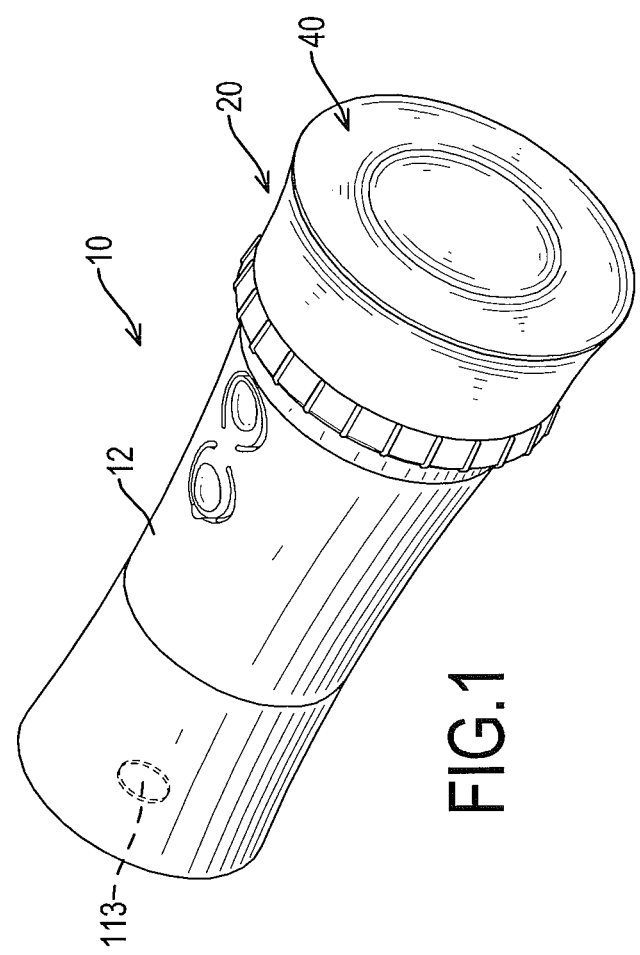
FIG. 1 is a perspective view of a first embodiment of a kaleidoscope in accordance with the present invention.
Figure 2:
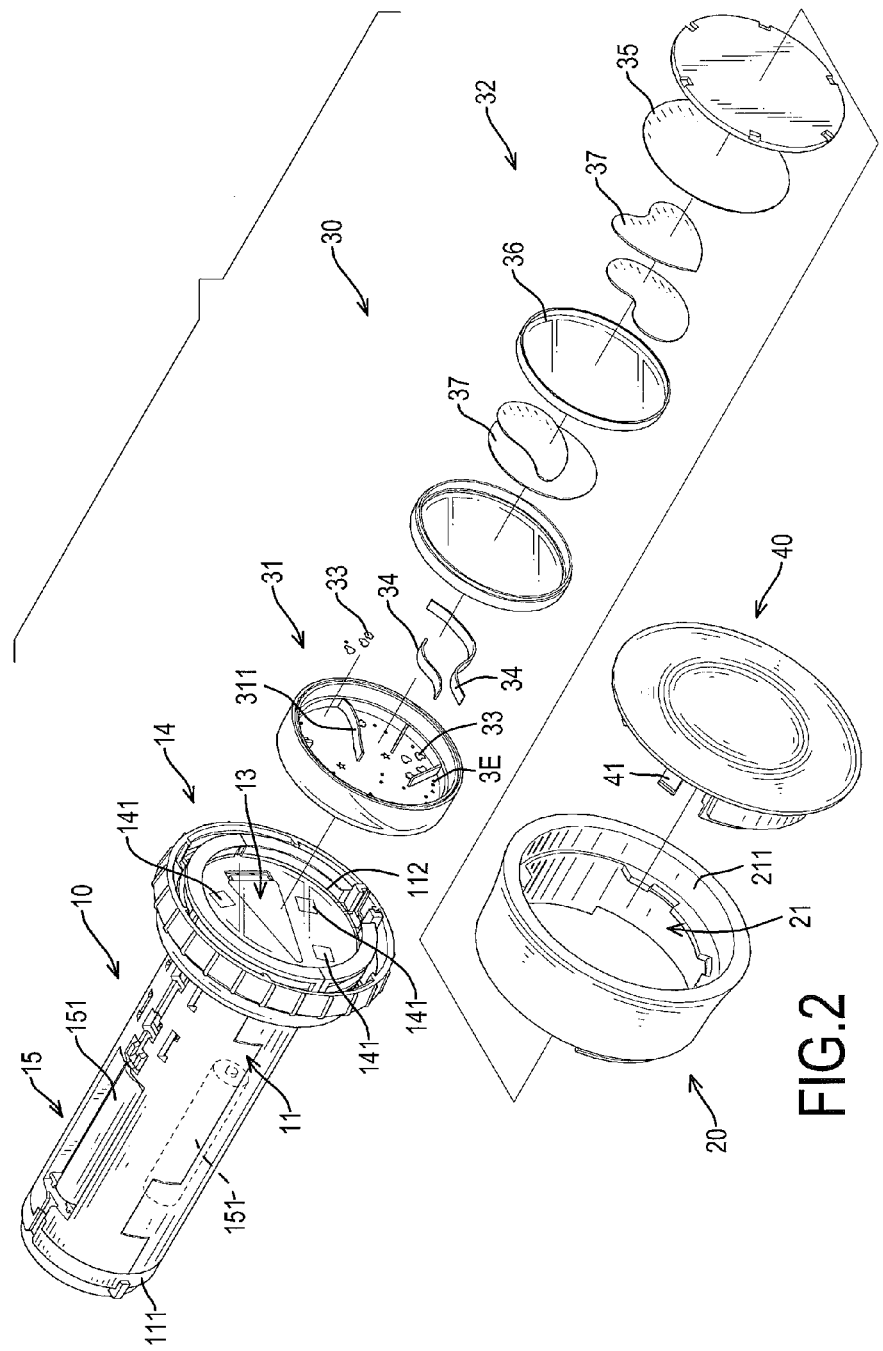
FIG. 2 is a partially exploded perspective view of the kaleidoscope in FIG. 1.

With reference to FIGS. 1 to 2, a first embodiment of a kaleidoscope in accordance with the present invention comprises a main body 10, a tubular cover 20, an object cell 30 and a lid 40. The main body 10 has a cylinder 11, a housing 12, a mirror unit 13, an LED (light emitting diode) unit 14 and a battery unit 15.

The cylinder 11 has a first end 111, a second end 112 and a lens 113. The second end 112 of the cylinder 11 is opposite to the first end 111 of the cylinder 11 and has an end surface. A central section of the end surface of the second end 112 of the cylinder 11 is pervious to light.

The lens 113 is located at the first end 111 of the cylinder 11. The housing 12 is mounted around the cylinder 11. The mirror unit 13 is axially mounted in the cylinder 11 and has multiple mirrors. The LED unit 14 is mounted on the cylinder 11 and has three LEDs 141. The LEDs 141 are adjacent to the end surface of the second end 112 of the cylinder 11. The battery unit 15 is mounted in the cylinder 11, is electrically connected with the LED unit 14 and has two batteries 151. The batteries 151 are respectively and radially located at two opposite sides of the cylinder 11. The batteries 151 may also be located at any other positions of the cylinder 11, and the present invention does not limit the positions of the batteries 151. The main body 10 may be conventional, and the detailed description is omitted.

The tubular cover 20 is rotatably connected with the cylinder 11 and has an end and a cover space 21. The end of the tubular cover 20 is rotatably connected with the second end 112 of the cylinder 11. The cover space 21 is axially formed through the tubular cover 20 and has an opening 211. The opening 211 of the cover space 21 is opposite to the end of the tubular cover 20. The tubular cover 20 may be body 10 may be conventional. Detailed description is omitted.

Figure 3:
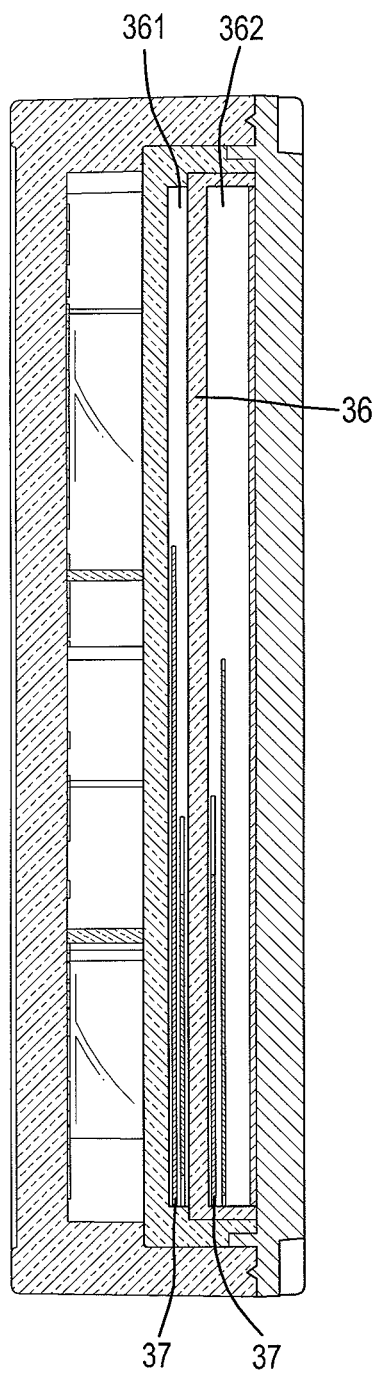
FIG. 3 is an enlarged cross sectional side view of the object cell of the kaleidoscope in FIG. 1.

With reference to FIGS. 2 to 4, the object cell 30 is securely mounted in the cover space 21. The object cell 30 may be clued to an inner surface of the tubular cover 20 or be connected securely with the tubular cover 20 by a way of an interference fit. Structural relationship between the tubular cover 20 and the object cell 30 may be conventional. Detailed description is omitted.

The object cell 30 has a round cross section, a scrap box 31, a background box 32, multiple scraps 33, a strip unit, a background 35, a plate 36, multiple colored films 37 and multiple colored beads 3E.

The scrap box 31 is pervious to light and abuts the end surface of the second end 112 of the cylinder 11.

The background box 32 is securely embedded in the scrap box 31. The scrap box 31 is located between the background box 32 and the end surface of the second end 112 of the cylinder 11.

The scraps 33 are movably mounted in the scrap box 31.

The strip unit is mounted in the scrap box 31. Preferably, the strip unit has multiple curved movable strips 34 and multiple fixed strips 311. The fixed strips 311 are mounted securely on an inner surface of the scrap box 31. The movable strips 34 are curved. Preferably, two movable strips 34 are implemented.

With further reference to FIG. 5, when the tubular cover 20 is rotated, the object cell 30 is also rotated, and the movable strips 34 are moved in the scrap box 31. With the movement of the movable strips 34, a user can see plenty of color combinations and pattern variations and is more willing to purchase the kaleidoscope in accordance with the present invention.

Additionally, liquid, bright beads or any colored object can be placed into the scrap box 31 to vary the patterns or color combinations. Moreover, the background box 32 may be securely screwed into the scrap box 31. The present invention does not limit the connection between the scrap box 31 and the background box 32.

The background 35 is mounted in the background box 32.

The plate 36 is pervious to light and is mounted securely in the background box 32 to partition an inner space of the background box 32 into a first space 361 and a second space 362. The second space 362 encompasses the background 35.

The colored films 37 are respectively mounted in the first space 361 and the second space 362 of the background box 32. The colored films 37 may have different shapes, colors or colorful track patterns, and the colored films 37 may be transparent, translucent or multiple-layered. The colored films 37 in the second space 362 are located between the background 35 and the plate 36.

The colored beads 3E are movably disposed in the scrap box 31.

When the object cell 30 is rotated, the colored films 37 are also moved in the first space 361 and the second space 362. With the movement of the colored films 37, the user can also see various patterns and color combinations and is more willing to purchase the kaleidoscope in accordance with the present invention.

Figure 6:
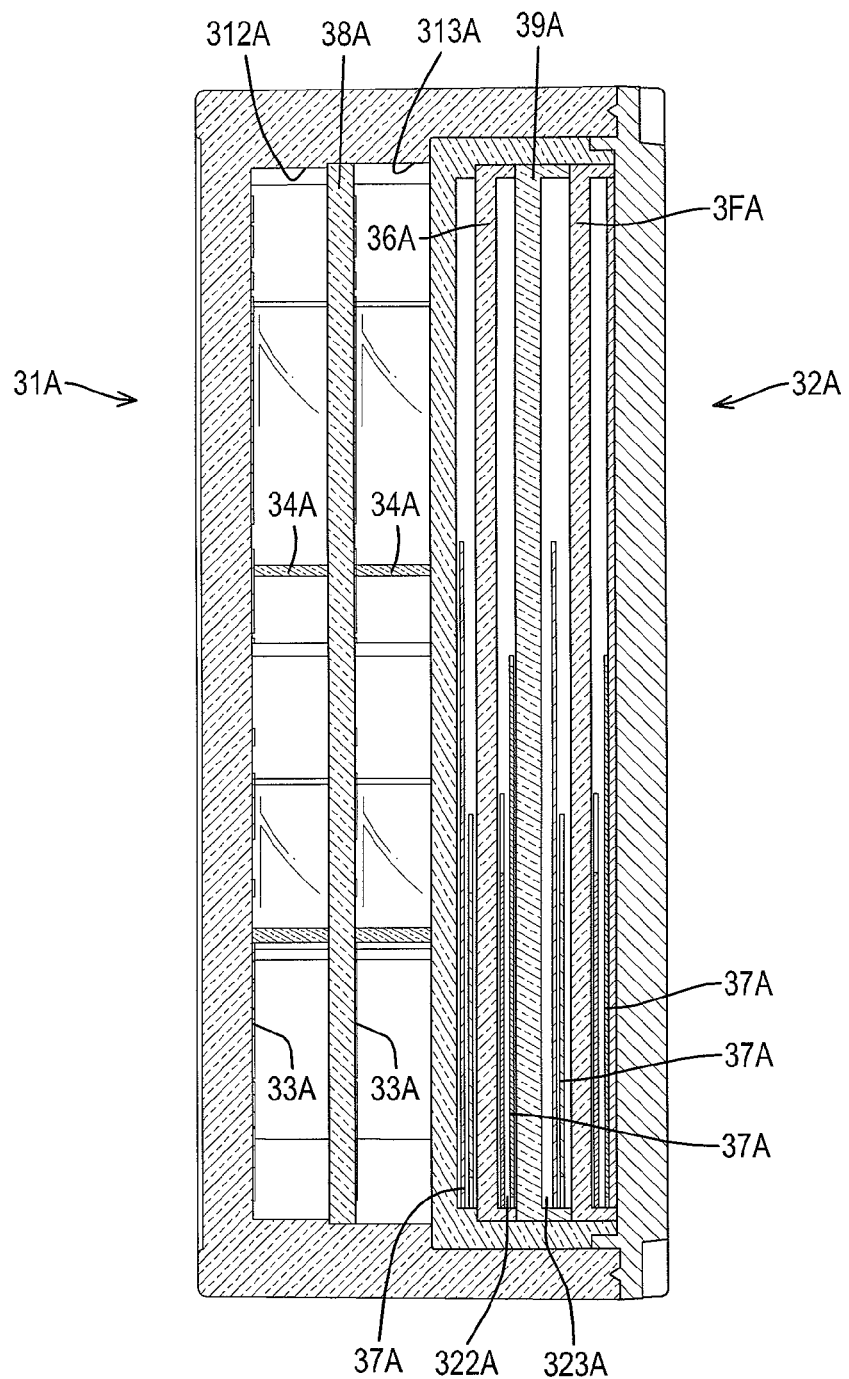
FIG. 6 is an enlarged cross sectional side view of a second embodiment of the object cell of a kaleidoscope in accordance with the present invention.

With reference to FIG. 2, the lid 40 is securely connected with the tubular cover 20, securely covers the tubular cover 20, seals the opening of the cover space 21 and has an end surface, an inner wall and multiple protrusions 41. The protrusions 41 are inserted into the cover space 21. The lid 40 may abut and engage the object cell 30 to secure the object cell 30 in the tubular cover 20. The present invention does not limit how the object cell 30 is securely mounted in the tubular cover 20. With reference to FIG. 6, a second embodiment of the kaleidoscope in accordance with the present invention is substantially the same as the first embodiment. The object cell 30A further has a first partition 38A.

The first partition 38A is pervious to light and is mounted securely in the scrap box 31A to partition an inner space of the scrap box 31A into a first deck 312A and a second deck 313A.

The scraps 33A are respectively mounted in the first deck 312A and the second deck 313A of the scrap box 31A.

The colored beads 3E are respectively disposed in the first deck 312A and the second deck 313A of the scrap box 31A.

The strip unit has multiple movable strips 34A. The movable strips 34A are respectively mounted in the first deck 312A and the second deck 313A of the scrap box 31A. Accordingly, the scrap box 31A is a double-decker design. With the movable strips 34A of the two decks, color combinations and patterns vary, and a stereoscopic image is achieved.

Preferably, the object cell 30A further has a second partition 39A previous to light and securely mounted in the background box 32A to partition the inner space of the background box 32A into a first deck 322A and a second deck 323A. Accordingly, the background box 32A is also a double-decker design. The object cell 30A further has a disk 3FA that is pervious to light. The plate 36A is mounted in the first deck 322A, and the disk 3FA is mounted in the second deck 323A of the background box 32A.

The colored films 37A are respectively located at the first spaces and the second spaces of the first deck 322A and the second deck 323A of the background box 32A. Therefore, the disk 3FA serves as another plate to partition the colored films 37A in the second deck 323A of the background box 32A. Consequently, the colored films 37A of four sets facilitate variations of the color combinations and patterns.

Figure 7:
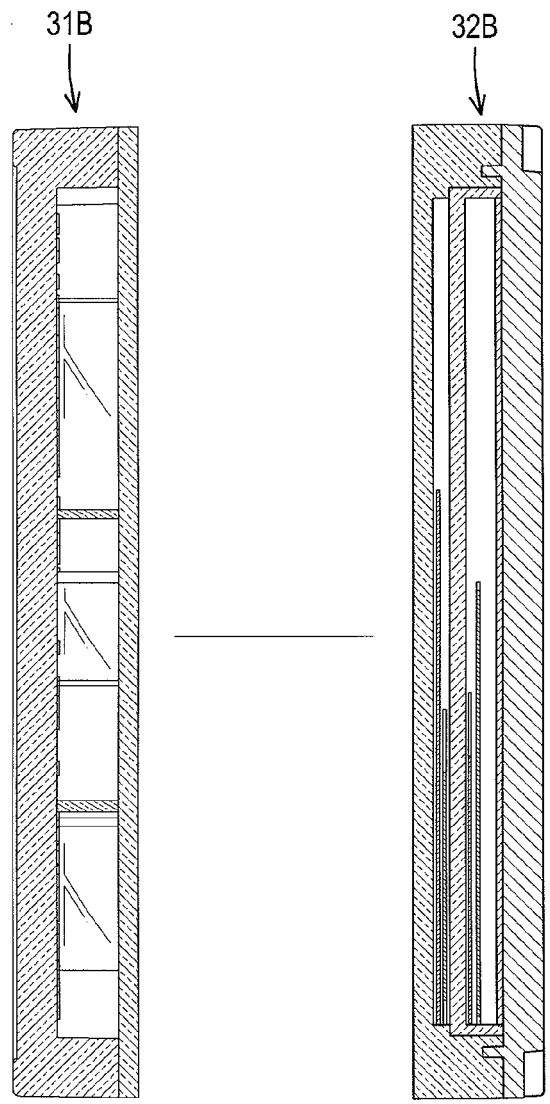
FIG. 7 is an enlarged exploded cross sectional side view of a third embodiment of the object cell of a kaleidoscope in accordance with the present invention.

With reference to FIG. 7, a third embodiment of the kaleidoscope in accordance with the present invention is substantially the same as the first embodiment. The background box 32B detachably abuts the scrap box 31B. Accordingly, the background box 32B or scrap box 31B can be selectively or both replaced as the user wishes, and this is very convenient.

Figure 8:
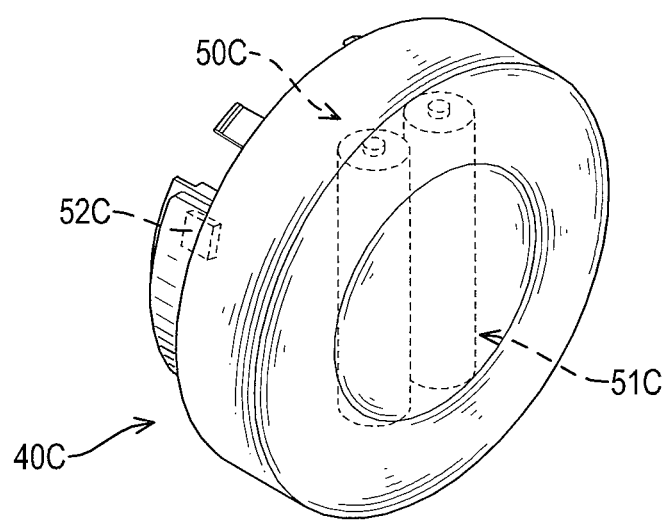
FIG. 8 is a perspective view of a fourth embodiment of the lid of a kaleidoscope in accordance with the present invention.

With reference to FIG. 8, a fourth embodiment of the kaleidoscope in accordance with the present invention is substantially the same as the first embodiment. The kaleidoscope further has an illuminating unit 50C. The illuminating unit 50C has a battery unit 51C and an LED 52C. The battery unit 51C of the illuminating unit 50C is securely mounted on the end surface of the lid 40C. The LED 52C of the illuminating unit 50C is securely mounted on the inner wall of the lid 40C and is electrically connected with the battery unit 51C mounted on the lid 40C. Accordingly, the LED 52C on the lid 40C illuminates the object cell 30 to further sparkle the scrap, 33 and the colored beads 3E in the object cell 30.

From the above description, it is noted that the present invention has the following advantages:

1. Increased color combinations and pattern variations:

With the movement of the movable strips 34, 34A, plenty of color combinations and pattern variations are seen, and a desire to purchase the kaleidoscope in accordance with the present invention increases. Moreover, the color combinations or patterns further vary when the movable strips 34, 34A hit the fixed strips 311 to generate arbitrary movement of the movable strips 34, 34A.

2. Movable colored films:

The colored films 37, 37A may have different shapes, colors or colorful track patterns, and the colored films 37, 37A may be transparent, translucent or multiple-layered. With the movement of the colored films 37, 37A, the user can also see various patterns and color combinations and is more willing to purchase the kaleidoscope.

3. Double-decker design:

Because the scrap box 31A and the background box 32A of the second embodiment are double-decker designs, color combinations and patterns vary, and a stereoscopic image is achieved.

4. Easy replacement:

With the background box 32B detachably abutting the scrap box 31B, the background box 32B or scrap box 31B can be selectively or both replaced as the user wishes. Consequently, a purchasing cost can be reduced.

5. Enhanced brightness:

With the LED 52C on the lid 40C illuminating the object cell 30, the scraps 33, 33A and the colored beads 3E in the object cell 30 are radially spotlighted and sparkle. Accordingly, a brightness of the object cell 30 is enhanced. Light generated by the LEDs 141, 52C can radially and axially illuminate the object cell 30.

Additionally, intensity of the light generated by the LEDs 141, 52C can be adjusted as the user wishes. The kaleidoscope in accordance with the present invention can also serve as a flashlight or a desk lamp when the object cell 30 is removed. Functions of the kaleidoscope are versatile and increase customers' purchasing desire.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A kaleidoscope comprising:
    a main body having:
        a cylinder having:
            a first end;
            a second end opposite to the first end of the cylinder and having an end surface, wherein a central section of the end surface of the second end of the cylinder is pervious to light; and
            a lens located at the first end of the cylinder;
        a housing mounted around the cylinder;
        a mirror unit axially mounted in the cylinder;
        an LED (light emitting diode) unit mounted on the cylinder; and
        a battery unit mounted in the cylinder and electrically connected with the LED unit;
    a tubular cover rotatably connected with the cylinder and having:
        an end rotatably connected with the second end of the cylinder; and
        a cover space axially formed in the tubular cover and having an opening that is opposite to the end of the tubular cover; and
    an object cell securely mounted in the cover space and having:
        a scrap box pervious to light and abutting the end surface of the second end of the cylinder;
        a background box abutting the scrap box, wherein the scrap box is located between the background box and the end surface of the second end of the cylinder;
        multiple scraps movably mounted in the scrap box;
        multiple colored beads movably disposed in the scrap box;
        a strip unit mounted in the scrap box;
        a background mounted in the background box;
        a plate pervious to light and mounted securely in the background box to partition an inner space of the background box into a first space and a second space; and
        multiple colored films respectively mounted in the first space and the second space of the background box.

2. The kaleidoscope as claimed in claim 1, wherein the strip unit has at least one curved movable strip.

3. The kaleidoscope as claimed in claim 2, wherein the strip unit has multiple fixed strips mounted securely on an inner surface of the scrap box.

4. The kaleidoscope as claimed in claim 3, wherein the object cell further has
    a first partition pervious to light and mounted securely in the scrap box to partition an inner space of the scrap box into a first deck and a second deck;
    the scraps are respectively mounted in the first deck and the second deck of the scrap box;
    the colored beads are respectively disposed in the first deck and the second deck of the scrap box; and
    the strip unit has multiple movable strips respectively mounted in the first deck and the second deck of the scrap box.

5. The kaleidoscope as claimed in claim 3, wherein the object cell further has a second partition previous to light and securely mounted in the background box to partition the inner space of the background box into a first deck and a second deck;
    the object cell has a disk pervious to light and mounted in the second deck of the background box; and
    the plate is mounted in the first deck of the background box.

6. The kaleidoscope as claimed in claim 3, wherein the background box detachably abuts the scrap box;
    the kaleidoscope further has a lid securely covering the tubular cover, sealing the opening of the cover space and having an end surface and an inner wall; and
    the kaleidoscope further has an illuminating unit having
        a battery unit securely mounted on the end surface of the lid; and
        an LED securely mounted on the inner wall of the lid and electrically connected with the battery unit mounted on the lid.

7. The kaleidoscope as claimed in claim 2, wherein the object cell further has
    a first partition pervious to light and mounted securely in the scrap box to partition an inner space of the scrap box into a first deck and a second deck;
    the scraps are respectively mounted in the first deck and the second deck of the scrap box;
    the colored beads are respectively disposed in the first deck and the second deck of the scrap box; and
    the strip unit has multiple movable strips respectively mounted in the first deck and the second deck of the scrap box.

8. The kaleidoscope as claimed in claim 2, wherein the object cell further has a second partition previous to light and securely mounted in the background box to partition the inner space of the background box into a first deck and a second deck;
    the object cell has a disk pervious to light and mounted in the second deck of the background box; and
    the plate is mounted in the first deck of the background box.

9. The kaleidoscope as claimed in claim 2, wherein the background box detachably abuts the scrap box;
    the kaleidoscope further has a lid securely covering the tubular cover, sealing the opening of the cover space and having an end surface and an inner wall; and
    the kaleidoscope further has an illuminating unit having
        a battery unit securely mounted on the end surface of the lid; and
        an LED securely mounted on the inner wall of the lid and electrically connected with the battery unit mounted on the lid.

10. The kaleidoscope as claimed in claim 1, wherein the object cell further has
    a first partition pervious to light and mounted securely in the scrap box to partition an inner space of the scrap box into a first deck and a second deck;
    the scraps are respectively mounted in the first deck and the second deck of the scrap box; and
    the colored beads are respectively disposed in the first deck and the second deck of the scrap box.

11. The kaleidoscope as claimed in claim 1, wherein the object cell further has a second partition previous to light and securely mounted in the background box to partition the inner space of the background box into a first deck and a second deck;
    the object cell has a disk pervious to light and mounted in the second deck of the background box; and
    the plate is mounted in the first deck of the background box.

12. The kaleidoscope as claimed in claim 1, wherein the background box detachably abuts the scrap box;

the kaleidoscope further has a lid securely covering the tubular cover, sealing the opening of the cover space and having an end surface and an inner wall; and the kaleidoscope further has an illuminating unit having
- a battery unit securely mounted on the end surface of the lid; and
- an LED securely mounted on the inner wall of the lid and electrically connected with the battery unit mounted on the lid.

13. An object cell for a kaleidoscope, the object cell comprising:
- a scrap box pervious to light;
- a background box abutting the scrap box;
- multiple scraps movably mounted in the scrap box;
- multiple colored beads movably mounted in the scrap box;
- a strip unit mounted in the scrap box; and
- a background mounted in the background box;
- a plate pervious to light and mounted securely in the background box to partition an inner space of the background box into a first space and a second space; and
- multiple colored films respectively mounted in the first space and the second space of the background box.

14. The object cell for a kaleidoscope as claimed in claim 13, wherein the strip unit has at least one curved movable strip.

15. The object cell for a kaleidoscope as claimed in claim 14, wherein
the object cell further has
- a first partition pervious to light and mounted securely in the scrap box to partition an inner space of the scrap box into a first deck and a second deck;
- the scraps are respectively mounted in the first deck and the second deck of the scrap box;
- the colored beads respectively mounted in the first deck and the second deck of the scrap box; and
- the strip unit has multiple movable strips respectively mounted in the first deck and the second deck of the scrap box.

* * * * *